United States Patent
Kwon et al.

(10) Patent No.: US 9,110,784 B2
(45) Date of Patent: Aug. 18, 2015

(54) NONVOLATILE RANDOM ACCESS MEMORY AND DATA MANAGEMENT METHOD

(71) Applicants: Oh-Seong Kwon, Hwaseong-si (KR); Jihyuk Oh, Suwon-si (KR)

(72) Inventors: Oh-Seong Kwon, Hwaseong-si (KR); Jihyuk Oh, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 257 days.

(21) Appl. No.: 13/892,837

(22) Filed: May 13, 2013

(65) Prior Publication Data

US 2014/0013034 A1 Jan. 9, 2014

(30) Foreign Application Priority Data

Jul. 9, 2012 (KR) ........................ 10-2012-0074717

(51) Int. Cl.
*G06F 12/02* (2006.01)
*G06F 11/14* (2006.01)

(52) U.S. Cl.
CPC ........ *G06F 12/0246* (2013.01); *G06F 11/1417* (2013.01); *G06F 12/0238* (2013.01); *G06F 2212/202* (2013.01)

(58) Field of Classification Search
CPC . G06F 12/0246; G06F 12/0238; G06F 12/02; G06F 2212/1008; G06F 11/1417; G06F 11/2284; G06F 2212/202; G06F 2212/2022; G06F 2212/2024; G06F 2212/2028
See application file for complete search history.

(56) References Cited

U.S. PATENT DOCUMENTS

| | | | |
|---|---|---|---|
| 4,896,289 A | | 1/1990 | Svinicki et al. |
| 5,579,522 A | * | 11/1996 | Christeson et al. ............... 713/2 |
| 5,623,673 A | * | 4/1997 | Gephardt et al. ............. 710/260 |
| 5,684,998 A | * | 11/1997 | Enoki et al. .................... 713/310 |
| 5,926,826 A | * | 7/1999 | Ninomiya et al. ............. 711/103 |
| 6,205,513 B1 | * | 3/2001 | Godicke et al. ................ 711/103 |
| 6,205,548 B1 | * | 3/2001 | Hasbun ............................. 713/2 |
| 6,594,723 B1 | * | 7/2003 | Chapman et al. ............. 711/103 |
| 7,103,684 B2 | | 9/2006 | Chen et al. |
| 7,167,945 B2 | | 1/2007 | Feldstein et al. |
| 7,313,024 B2 | | 12/2007 | Lee |
| 7,383,362 B2 | | 6/2008 | Yu et al. |
| 7,478,285 B2 | | 1/2009 | Fouquet-Lapar |
| 7,552,251 B2 | | 6/2009 | Yu et al. |
| 7,577,059 B2 | | 8/2009 | Pyeon |
| 7,589,998 B2 | | 9/2009 | Kang et al. |
| 7,889,544 B2 | | 2/2011 | Chow et al. |
| 7,966,429 B2 | | 6/2011 | Chow et al. |
| 8,041,904 B2 | | 10/2011 | Ergan et al. |

(Continued)

FOREIGN PATENT DOCUMENTS

| | | |
|---|---|---|
| EP | 0433979 A2 | 12/1990 |
| EP | 0514697 A2 | 4/1992 |

(Continued)

*Primary Examiner* — Michael Krofcheck
(74) *Attorney, Agent, or Firm* — Volentine & Whitt, PLLC

(57) ABSTRACT

A data management method for a main memory including a memory controller and a nonvolatile RAM includes; designating code page data temporarily stored in a standby area of the nonvolatile RAM as set, copying the code page data from the standby area to an in-use area of the nonvolatile RAM, designating the code page data stored in the in-use area as reset, and thereafter, during rebooting of a user device incorporating the main memory, invalidating the reset code page data while retaining the set code page data in the nonvolatile RAM.

20 Claims, 12 Drawing Sheets

(56) References Cited

U.S. PATENT DOCUMENTS

| | | |
|---|---|---|
| 8,130,575 B2 | 3/2012 | Hanzawa et al. |
| 2004/0083405 A1* | 4/2004 | Chang et al. .................. 714/24 |
| 2005/0240756 A1 | 10/2005 | Mayer |
| 2007/0128899 A1 | 6/2007 | Mayer |
| 2008/0177994 A1 | 7/2008 | Mayer |
| 2009/0070885 A1* | 3/2009 | Mersh ........................ 726/27 |
| 2010/0061150 A1* | 3/2010 | Wu et al. ................ 365/185.08 |
| 2010/0306520 A1 | 12/2010 | Jeon et al. |
| 2011/0040938 A1 | 2/2011 | Jeon et al. |
| 2011/0066837 A1 | 3/2011 | Lee et al. |

FOREIGN PATENT DOCUMENTS

| | | |
|---|---|---|
| JP | 09212051 A | 8/1997 |
| KR | 1020020078230 A | 10/2002 |
| KR | 1020060019971 A | 3/2006 |
| KR | 1020100128033 A | 12/2010 |

* cited by examiner

NONVOLATILE RANDOM ACCESS MEMORY AND DATA MANAGEMENT METHOD

CROSS-REFERENCE TO RELATED APPLICATIONS

A claim of priority under 35 U.S.C. §119 is made to Korean Patent Application No. 10-2012-0074717 filed Jul. 9, 2012, the subject matter of which is hereby incorporated by reference.

BACKGROUND

The inventive concept relates to semiconductor memories and user devices including such memories. More particularly, the inventive concept relates to fast nonvolatile memories and data management methods suitable for use as a main memory in certain user devices.

In their operative nature, semiconductor memories are volatile or nonvolatile. Volatile semiconductor memories are able to perform read/write operations at relatively high speed, but stored data is lost in the absence of applied power. In contrast, nonvolatile semiconductor memories retain stored data even in the absence of applied power.

Consumer electronics, computers and similar user devices generally include a number of different memory components (or "memories") that may be respectively or interchangeably used for different purposes. These such memories include a "main memory" that may be used as a primary working space during data transfer, computation and similar user devices functions. Main memories are generally required to be over-writeable and provide fast data access. As a result, Dynamic Random Access Memories (DRAMs) have been conventionally used to implement many main memories. However, DRAM-based main memories consume high levels of power and are volatile in nature.

In recent years, research has been directed to the development of nonvolatile memories capable of providing high data density and large data storage capacity. Flash memory has been widely used in many commercial applications, and primarily in handheld electronic devices to meet these demands. However, research into nonvolatile memory alternatives that may effectively be used as main memory components continues. That is, alternative are being sought that provide a large, nonvolatile, fast access main memory capable of being directly overwritten. For example, ferroelectric RAM (FRAM) that use a ferroelectric capacitor, magnetic RAM (MRAM) that use a tunneling magneto-resistive (TMR) film, phase change RAM that use chalcogenide alloys, and resistive RAM (RRAM) that use one or more variable resistance material(s) as a data storage medium have been specifically considered.

Nonetheless, research and development continues into the development of low power, over-writable, nonvolatile, randomly-accessible memory. More particularly, research continues into certain nonvolatile RAM that may be used in conjunction with a variety of legacy computer system interfaces.

The use of a nonvolatile RAM, however physically implemented, as a working memory is not without significant problems. For example, the retention of stored data by a nonvolatile RAM following power interruption may actually cause operating or re-boot coherency problems in systems using certain interfaces. That is, during a reset or reboot operation caused by a data error, the source data containing the error will be retained in the nonvolatile RAM. Such as occurrence may then result in continuing (or infinite) re-boot failures.

SUMMARY

Embodiments of the inventive concept provide data management methods that better control user data stored in a nonvolatile RAM.

In one embodiment, the inventive concept provides a data management method for a main memory including a memory controller and a nonvolatile RAM, the method comprising; designating code page data temporarily stored in a standby area of the nonvolatile RAM as set, copying the code page data from the standby area to an in-use area of the nonvolatile RAM, designating the code page data stored in the in-use area as reset, and thereafter, during rebooting of a user device incorporating the main memory, invalidating the reset code page data while retaining the set code page data in the nonvolatile RAM.

In another embodiment, the inventive concept provides a data management method for a main memory including a memory controller and a nonvolatile RAM, the method comprising; executing a power-on routine in a user device incorporating the main memory, determining whether the nonvolatile RAM is reset enabled, upon determining that the nonvolatile RAM is reset enabled, invalidating code page data designated as reset while retaining the code page data designated as set in the nonvolatile RAM, and then loading an operating system from an auxiliary storage to the nonvolatile RAM, else upon determining that the nonvolatile RAM is not reset enabled, loading the operating system from the auxiliary storage to the nonvolatile RAM.

In another embodiment, the inventive concept provides a data management method for a main memory including a memory controller and a nonvolatile RAM, the method comprising; executing a power-on routine in a user device incorporating the main memory, determining whether the user device was abnormally powered-down, upon determining that the user device was abnormally powered-down, invalidating code page data designated as reset while retaining the code page data designated as set in the nonvolatile RAM, and then loading an operating system from an auxiliary storage to the nonvolatile RAM, else upon determining that the user device was not abnormally powered-down, executing the operating system without regard to the set and reset designation of the code page data stored in the nonvolatile RAM.

BRIEF DESCRIPTION OF THE DRAWINGS

The above and other objects and features will become more readily apparent upon consideration of the following description with reference to the accompanying drawings.

DETAILED DESCRIPTION

Figure 1:
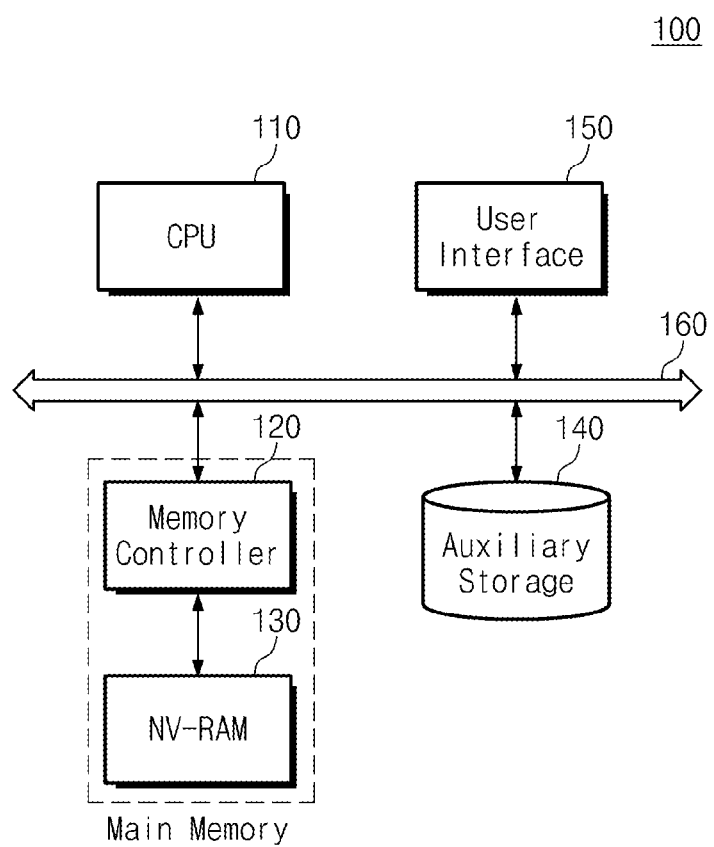
FIG. 1 is a block diagram illustrating a user device according to an embodiment of the inventive concept.

Embodiments of the inventive concept will now be described in some additional detail with reference to the accompanying drawings. The inventive concept may, however, be embodied in different forms, and should not be construed as being limited to only the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like or similar elements throughout the written description and drawings. In the drawings, the size(s) and relative size(s) of certain layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure (FIG.) 1 is a block diagram illustrating a user device according to an embodiment of the inventive concept. Referring to FIG. 1, a user device 100 comprises a Central Processing Unit (CPU) 110, a memory controller 120, a nonvolatile RAM 130, an auxiliary storage device 140, and a user interface 150. The user device 100 further comprises a system bus 160 that electrically interconnects the foregoing components (e.g., 110, 120, 140, and 150). The combination of the memory controller 120 and nonvolatile RAM 130 is considered a main (or working) memory within user device 100.

The CPU 110 may be used to process data within the user device 100. The CPU 110 may also be used to control the operation of, and access to, the components connected via the system bus 160. For example, during a boot (or re-boot) operation (hereafter "booting" or "re-booting"), the CPU 110 may access the auxiliary storage device 140 according to a defined control sequence in order to "drive" one or more constituent program(s), such as an Operating System (OS). That is, the CPU 110 may control the auxiliary storage device 140 and the memory controller 120 to read OS data stored at the auxiliary storage device 140 and store it in the nonvolatile RAM 130. Those skilled in the art will understand that this specific example is merely exemplary of many control operations that may be performed by the CPU 110 within the user device 100.

The CPU 110 may be implemented as one or more processors or a multiprocessor in certain embodiments of the inventive concept. Multiple processors functionally forming the CPU 110 may be used to effect distributed processing (e.g., parallel multi-tasking) in order to facilitate the execution of control, data access and transfer, and/or computational operations.

The memory controller 120 may be used to control operation of the nonvolatile RAM 130 in response to commands or data "requests" made by the CPU 110. For example, the memory controller 120 may be used to control the nonvolatile RAM 130 during program, read and erase operations. The memory controller 120 may be operated as a Direct Memory Access (DMA) component using conventionally understood techniques in order to facilitate the exchange of large data blocks between the auxiliary storage device 140 and the nonvolatile RAM 130.

The nonvolatile RAM 130 serves as the data storage component of the main memory within the user device 100. The nonvolatile RAM 130 may implemented with one or more nonvolatile memory device(s) that supports defined byte access protocols for legacy DRAM. Data stored in the nonvolatile RAM 130 will be directly over-writable to mimic DRAM capabilities. In one aspect, the nonvolatile RAM 130 may be used as a working memory that stores an OS operating within the user device 100. In another aspect, the nonvolatile RAM 130 may be used as a working memory that stores all or part of an application program running on the user device. In general, the nonvolatile RAM 130 provides memory space that allows stored data to be readily updated (i.e., quickly and with low system resource expenditures). In certain embodiments, the nonvolatile RAM 130 may be implemented as a multi-chip set or as a Dual In-line Memory Module (DIMM).

A memory area provided by the nonvolatile RAM 130 may variously allocated according to need using conventionally understood techniques. For example, the memory area may be partitioned into a "standby" area and an "in-use" area. An OS or application program may initially be loaded into the standby area of the nonvolatile RAM 130 from the auxiliary storage device 140. In contrast, a program to be executed by the CPU 110 may be loaded into the in-use area. One example of a memory area that may be used in the nonvolatile RAM 130 will be described herewith in some additional detail with reference to FIG. 2.

When a user device is rebooted due to a system error, data stored in the in-use area of the nonvolatile RAM 130 must be reset. In contrast, data stored at the standby area of the nonvolatile RAM 130 may be retained following rebooting. Although the user device is rebooted due to a system error, the cause of the system error (e.g., errant data stored in the in-use area) may be removed. However, data stored in the standby area may be retained. Hence, it is possible to improve the overall performance of the user device 100 and better optimize the user experience.

The auxiliary storage device 140 may be used to store data such as user data, an OS, an application program, and so on. The auxiliary storage device 140 may be a hard disk drive (HDD), a solid state drive (SSD), or a hybrid HDD, for example. The auxiliary storage device 140 may be a large-capacity storage device, and may store programs executed by the user device 100, codes, and setting data. However, the auxiliary storage device 140 may not be limited to the above-described examples.

The user interface 150 may be formed of devices which receive data and display data. The user device 100 may exchange information with a user through the user interface 150. The user interface 150 may further include a battery, a modem, and so on. Although not shown in figures, the user device 100 may further include an application chipset, a camera image processor (CIS), a mobile DRAM, and so on.

As noted above, the user device 100 uses the nonvolatile RAM 130 as a main (or working) memory. According to embodiments of the inventive concept, data associated with certain programs (hereafter, generally referred to as "program data") loaded to the nonvolatile RAM 130 may be deleted or reset during rebooting. Yet, all such program data loaded to the nonvolatile RAM 130 need not necessarily be deleted or reset as the result of rebooting. By intelligently considering the disparate nature of the program data variously stored in the nonvolatile RAM 130, the user device 100 of FIG. 1 may reboot due to an error associated with stored program data, and nonetheless avoid the infinite loop problem noted above.

Figure 2:
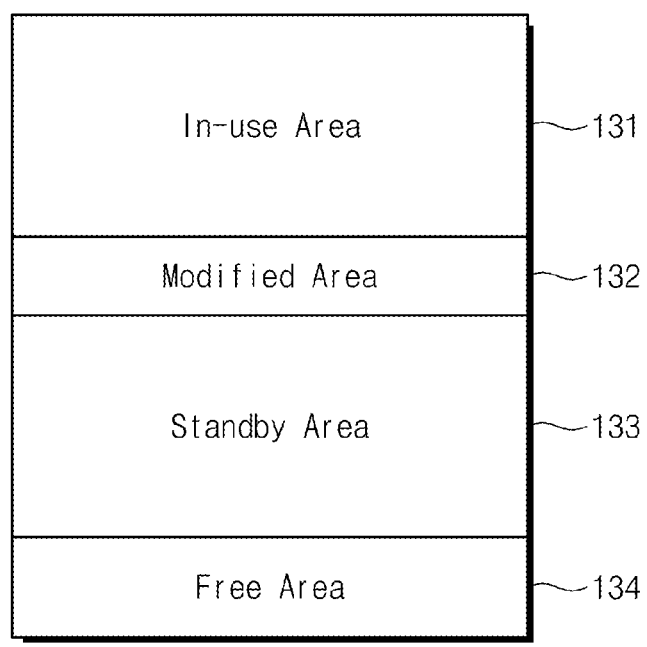
FIG. 2 is a conceptual diagram illustrating memory areas in the main memory (e.g., a nonvolatile RAM) of FIG. 1.

FIG. 2 is a diagram illustrating certain memory areas that may be defined within the nonvolatile RAM 130 of FIG. 1. Other memory areas may exist or be differently named within the nonvolatile RAM 130. Referring to FIG. 2, the nonvolatile RAM 130 is partitioned into an in-use area 131, a modified area 132, a standby area 133, and a free area 134.

The in-use area 131 may be used to store program data (e.g., program code associated with an OS and/or application). It is assumed for purposes of explanation that data stored in the nonvolatile RAM 130 is stored on a page basis. It should be further noted that the term "program data" includes not only executable programming code, but also data files (including user data files) and data elements generated by operation of an OS or application.

The modified area 132 may be used to store "updated data" associated with program data stored at the in-use area 131. For example, a table or data element having a changed value from that stored in the in-use area 131 may be stored in the modified area 132. Once updated data stored in the modified area 132 has been subsequently stored (e.g.,) in the auxiliary storage device 140, said updated data may be deleted from the modified area 132.

The standby area 133 may be used as a buffer memory of sorts that temporarily stores program data to be stored in the in-use area 131. For example, program data retrieved from the auxiliary storage device 140 may transit though the standby area 133 as it is loaded to the in-use area 131. In certain embodiments of the inventive concept, page (or block) copy operations may be used to transfer data from the standby area 133 to the in-use area 131. In other embodiments, the same effect may be accomplished without page copy operations by merely swapping addresses between the standby area 133 and the in-use area 131.

The free area 134 essentially serves as a reservoir of unused memory area. It should understood that the respective boundaries of the in-use area 131, the modified area 132, and the standby area 133 may be dynamic is definitional nature. Hence, the free area 134 may be understood as empty, deleted and/or invalid memory area within the main memory 130 of the user device 100.

Within the context of the user device 100, upon rebooting, data including program data stored at the nonvolatile RAM 130 may be selectively reset or deleted according to the specific area in which it is stored. For example, data stored in the in-use and modified areas 131 and 132 may be reset to "invalid" upon rebooting. However, data stored in the standby area 133 may be retained through rebooting. This different data handling approach arises from the fact that the data stored in the standby area 133 should exist in an unaltered (and valid) state, despite the intervening system error. Accordingly, serious reboot errors (e.g., an infinite reboot loop) should not occur so long as potentially errant data is replaced in the in-use area 131 and the modified area 132.

Figure 3:
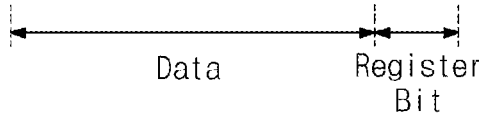
FIG. 3 is a table further illustrating the memory areas of FIG. 2.

FIG. 3 is a table further illustrating the partitioning of memory area within the nonvolatile RAM 130 of FIG. 1. Referring to FIG. 3, each data page stored in the nonvolatile RAM 130 may include a register bit that may be set/reset according to whether the associated data has been stored in an executable (or program-changeable) location within the nonvolatile RAM 130.

As assumed above, the CPU 110 manages the nonvolatile RAM 130 on a page unit basis. In certain embodiments, a page of data stored in the nonvolatile RAM 130 may be divided into a code page and a data page. The code page may be used to store data specifying a command, instruction, etc.

The data page may be used to store data that has been potentially updated by execution of the code page data. The origin of code page may be the auxiliary storage device 140. If a code page requested during execution of a program does not exist in the nonvolatile RAM 130, it may be loaded from the nonvolatile RAM 130 or the auxiliary storage device 140.

A code page read from the auxiliary storage device 140 may be temporarily stored in the standby area 133. At this point in time, the code page may be marked with a set register bit (e.g., a logical value of "1"). Then, when the CPU 110 requests execution of the code page stored in the standby area 133 it may be effectively swapped or copied into the in-use area 131 by resetting the register bit (e.g., a logical value of "0").

A data page may be generated as the result of execution of one or more code page(s). To create or store data page(s), the CPU 110 may assign a corresponding number of page(s) from the free area 134 as data page(s). Free pages assigned as data page(s) may be temporarily stored in the modified area 132. Register bits of data pages written at the modified area 132 may be reset. Using this approach, all pages having a reset register bit (e.g., logical "0") will be designated as being invalid (or erased to a specific pattern) during rebooting.

As the number of data pages increases due to execution of code pages, the number of pages requested from the free area to the modified area 132 will increase. Also, as the number of code pages executed by the CPU 110 increases, the number of pages to be loaded onto the in-use area 131 will increase. Given the physical size of the nonvolatile RAM 130, the free area 134 may become depleted Accordingly, code pages copied to the in-use area 131 and being currently executed, from among code pages retained by the standby area 133 may be recycled to the free area 134. Register bits of recycled pages to the free area 134 may be respectively reset to logical "0", and may marked as invalid or programmed to a specific pattern during system rebooting.

Those skilled in the art will recognize that there are many different programing techniques that may be used to designate data entries stored in a nonvolatile RAM as being invalid verses valid for purposes of memory system reboot. An example using a register bit per stored page of data has been described, but other designations may be used. Such designations may be collected in a table, register, or file within the nonvolatile RAM 130 and/or the memory controller 120. Register bits stored at the register may be referred to reset pages of the nonvolatile RAM 130 selectively. Also, register bits may be stored at a metadata area corresponding to each page of the nonvolatile RAM 130. Alternatively, register bits may be stored at a separate nonvolatile register of the nonvolatile RAM 130.

Figure 4:
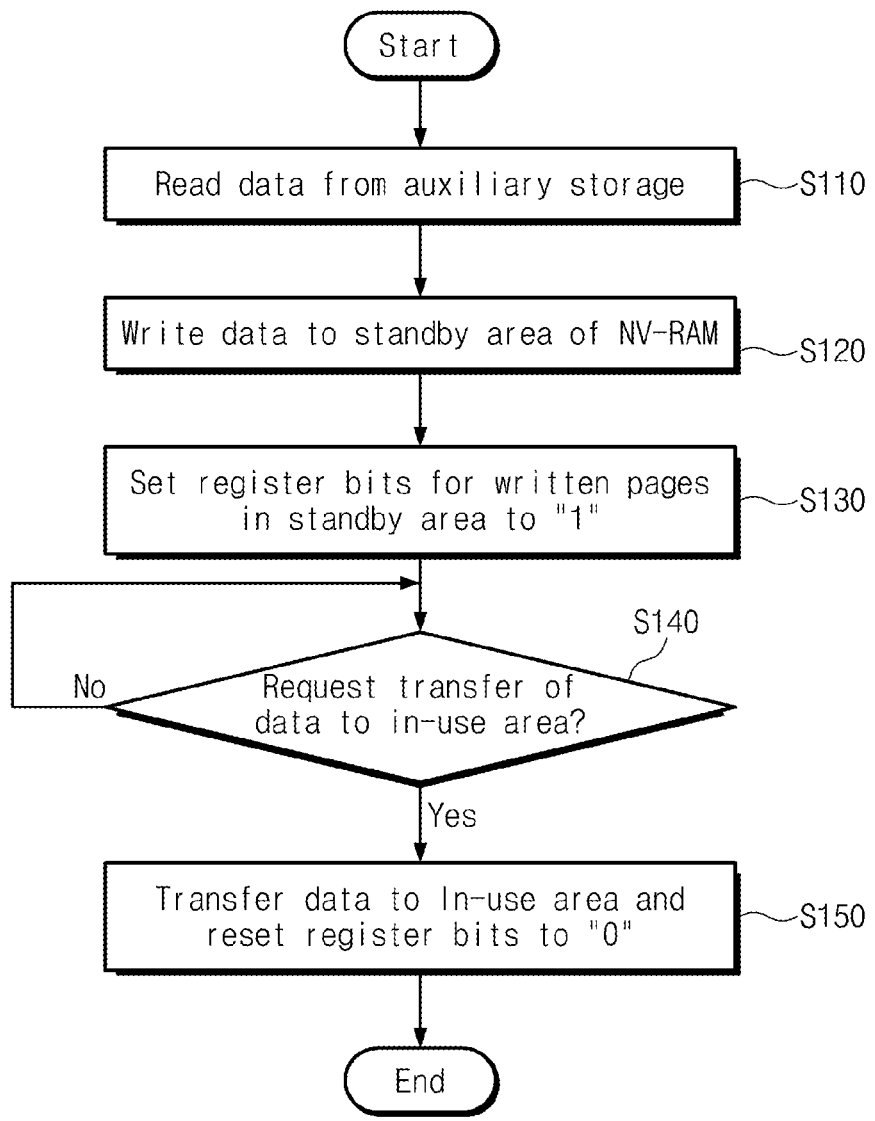
FIG. 4 is a flowchart summarizing a data management method for a nonvolatile RAM according to an embodiment of the inventive concept.

FIG. 4 is a flowchart summarizing a data management method for a nonvolatile RAM according to an embodiment of the inventive concept. In the description of FIG. 4 that follows, a main memory is assumed that is like the main memories previously described in relation to FIGS. 1-3 (e.g., a register bit is processed when at least one code page is transferred to the nonvolatile RAM 130).

It is initially assumed that the CPU 110 requests at least one code page from a specific program be retrieved from the auxiliary storage 140 (S110). The identified code page is then read from the auxiliary storage device 140 in response to the request by the CPU 110. In certain embodiments, retrieved code pages may be compressed for transfer from the auxiliary storage device 140 to the main memory 130, and decompressed when stored in the nonvolatile RAM 130.

Next, the CPU 110 and the memory controller 120 may interoperate to write the identified code pages to the standby area 133 of the nonvolatile RAM 130 (S120).

The CPU 110 controls the memory controller 120 such that register bits of code pages written to the standby area 133 are respectively set to logical "1" (S130). The memory controller 120 may control the nonvolatile RAM 130 such that register bits of code pages in the standby area 133 are programmed to logical "1", respectively. At the same time, the CPU 110 may control the memory controller 120 such that register bits of pages corresponding to the modified area 132 and/or the free area 134 are set to logical "0", respectively. In the illustrated embodiment of FIG. 4, operations S120 and S130 are presented as being independently performed. However, this need not be the case and the operations S120 and S130 may be performed at the same time.

Next, the CPU 110 waits and determines whether a transfer of code page(s) stored in the standby area 133 to the in-use area 131 is requested (S140).

Upon determining that a transfer of code page(s) is requested, the CPU 110 copies (or swaps) code pages from the standby area 133 to the in-use area 131 according to execution of a specific program (S150). Register bits associated with the "moved" code pages, now stored in the in-use area 131, are reset to logical "0".

In the described data management method, execution of a code page corresponding to a specific program may result in the generation of a data page different from the corresponding code page store din the auxiliary storage device 140. In cases where a data page is generated, it may be stored in the modified area 132 with a reset register bit of logical "0". Data pages may subsequently be copied to update the code page stored in the auxiliary storage device 140 according to a user command or during routine housecleaning operations.

Figure 5:
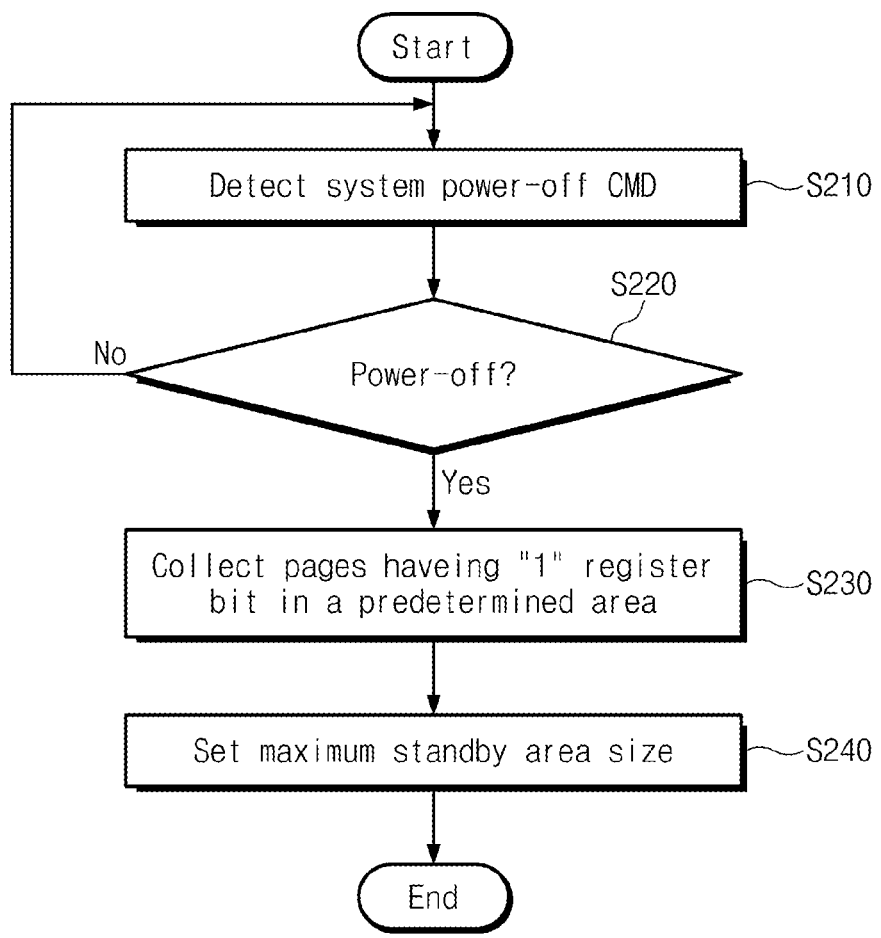
FIG. 5 is a flowchart illustrating a data management method of for nonvolatile RAM according to another embodiment of the inventive concept.

FIG. 5 is a flowchart summarizing a data management method for a nonvolatile RAM according to another embodiment of the inventive concept. Referring to FIG. 5, pages of the nonvolatile RAM 130 may be rearranged by the memory arrangement operation in response to a system-off command. That is, the CPU 110 may be used to detect a system power-off command or flag (S210). Such system power-off commands or flags may result from normal user operations or systems errors to an unintended system error.

Upon detecting a system power-off command, the CPU 110 may be used to perform a memory arrangement operation related to the nonvolatile RAM 130 (S230). Namely, the CPU 110 may essentially defragment the nonvolatile RAM 130 in accordance with register bit values for corresponding pages. For example, the CPU 110 may collect all pages designated in the standby area 133 and therefore having a register bit value of "1" in a predetermined area.

Thereafter, the CPU 110 may define the size of the standby area 133 to a maximum allowable size in order to facilitate loading of an OS and possibly a variety of applications called by the OS during rebooting (S250).

Figure 6:
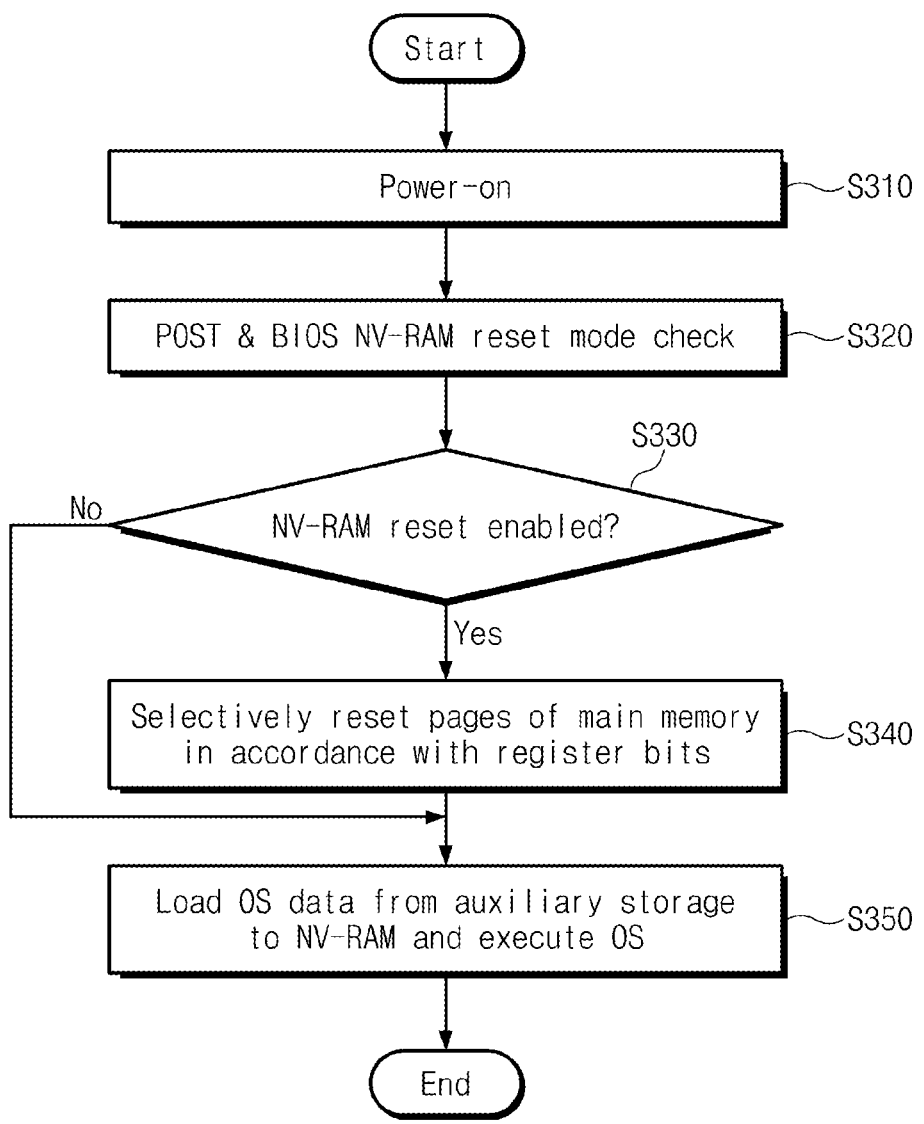
FIG. 6 is a flowchart summarizing a boot method for a user device according to an embodiment of the inventive concept.

FIG. 6 is a flowchart summarizing a booting (or rebooting) method for a user device according to an embodiment of the inventive concept wherein data stored in the nonvolatile RAM 130 may be selectively reset in accordance with register bits.

Initially, the user device 100 is powered-on by a user (S310). Alternatively, rebooting may be automatically performed by the user device 100 in response to a generated error. When the user device 100 is powered-on, the CPU 110 may reset a program counter. An address first accessed by the CPU 110 upon reset of the program counter may be the beginning address for a boot program.

As the boot program is executed, the CPU 110 may perform a Power-On Self-Test (POST) to determine whether the user device 100 is functioning normally (S320). After completing the POST, the boot program may test whether components such as the CPU 110, the main memory 120 and 130, an auxiliary storage device 140, and so on, are driven normally. The BIOS of the user device 100 may include resetting the nonvolatile RAM 130. A default value may be decided such that resetting of the nonvolatile RAM 130 is inactivated and is activated by a user. If the resetting of the nonvolatile RAM 130 is inactivated, the resetting of the nonvolatile RAM 130 may be selected at the POST process.

In operation S330, if the resetting of the nonvolatile RAM 130 set at the BIOS is determined to be activated, the method proceeds to operation S340. On the other hand, if the resetting of the nonvolatile RAM 130 set at the BIOS is determined to be inactivated, the method proceeds to operation S350.

The boot program may selectively reset pages stored at the nonvolatile RAM 130 according to the register bits (S340). For example, pages each corresponding to a register bit of "0" may be deleted or programmed to have a specific data pattern Ex (i.e., a pattern in which all bits are set to logical "0", respectively).

After the nonvolatile RAM 130 is reset, the boot program may read a master boot record (MBR) from a first sector of an auxiliary storage device 140 to load the OS (S350). The boot program may search and execute a bootable partition based on the MBR. The OS may be loaded onto the nonvolatile RAM 130 from the auxiliary storage device 140 by a booting code. If the OS loaded onto the nonvolatile RAM 130 is executed, the overall authority of the user device 100 may be returned to the OS. Afterwards the OS may manage pages of the nonvolatile RAM 130 according to a method described with reference to FIG. 4 or 5.

Figure 7:
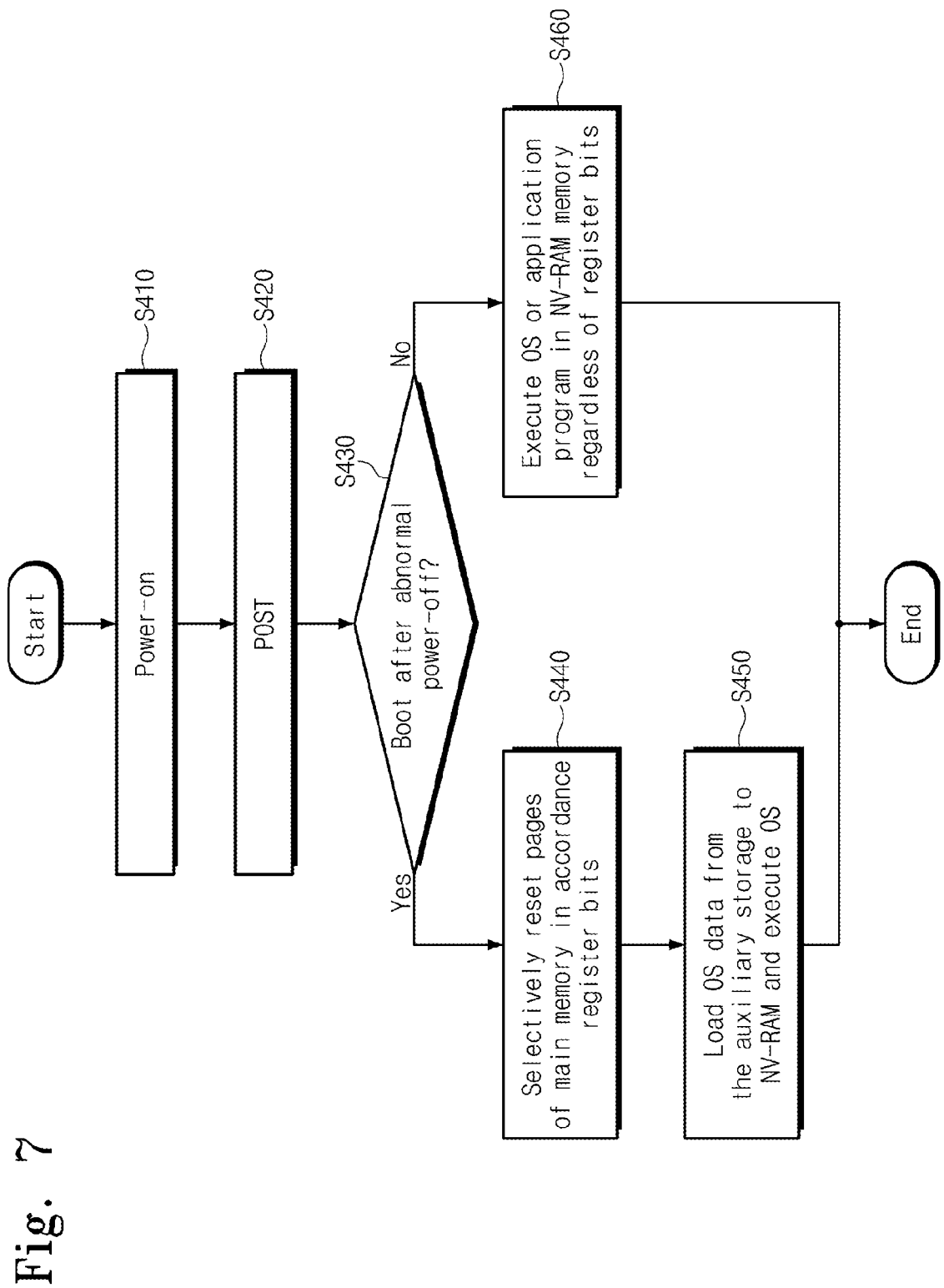
FIG. 7 is a flowchart illustrating a boot method for a user device according to another embodiment of the inventive concept.

FIG. 7 is a flowchart summarizing a booting (rebooting) method for a user device according to another embodiment of the inventive concept. Referring to FIG. 7, during the booting operation, a nonvolatile RAM 130 may be reset differently according to whether the booting operation is performed after a "normal" or "abnormal" power-off. Information indicating whether the user device 100 was normally or abnormally powered-off may be stored in (e.g.,) the system file or OS.

Upon power-on of the user device 100, the CPU 110 may reset a program counter (S410). An address first accessed by the CPU 110 according to resetting of the program counter may be set to an address of a boot program of the BIOS.

Then, the boot program is executed and the CPU 110 may perform the POST to determine whether the user device 100 is operating normally (S420). Following the POST, the boot program may test whether components such as the CPU 110, a main memory 120 and 130, an auxiliary storage device 140, and so on are operating normally. Also, the CPU may determine whether the user device 100 was normally or abnormally powered-off (S430).

If the user device 100 was abnormally power-off before booting, the method proceeds to operation S440. If the user device 100 was normally powered-off before booting, the method proceeds to operation S460.

The boot program may selectively reset pages stored at the nonvolatile RAM 130 based on register bits (S440). For example, pages each corresponding to a register bit of "0" may be deleted or programmed to have a specific data pattern, i.e., a pattern in which all bits are set to logical "0", respectively).

After the nonvolatile RAM 130 is reset, the boot program may read a master boot record (MBR) from a first sector of an auxiliary storage device 140 to load the OS (S450). The boot program may search and execute a bootable partition based on the MBR. The OS may be loaded onto the nonvolatile RAM 130 from the auxiliary storage device 140 by a booting code. If the OS loaded onto the nonvolatile RAM 130 is executed, the overall authority of the user device 100 may be returned to the OS. Afterwards the OS may manage pages of the nonvolatile RAM 130 according to a method described with reference to FIG. 4 or 5.

Alternately, the boot program may not reset the nonvolatile RAM 130 (S460). The boot program may execute the OS maintained at an in use area 131 of the nonvolatile RAM 130. If the OS 130 is executed, the overall authority of the user device 100 may be returned to the OS. A specific application program existing at the in use area 131 or a standby area 133 before booting may be executed by the OS.

As described above, at booting performed after normal power-off of the user device 100, the OS or an application program loaded onto the nonvolatile RAM 130 may be executed regardless of register bits. In this case, it is possible minimize an access to the auxiliary storage device 140 and to boot a system in high speed. Since a frequently used application program exists at the standby area 133, at booting, a driving circumstance may be set to be optimized to a user circumstance.

Figure 8:
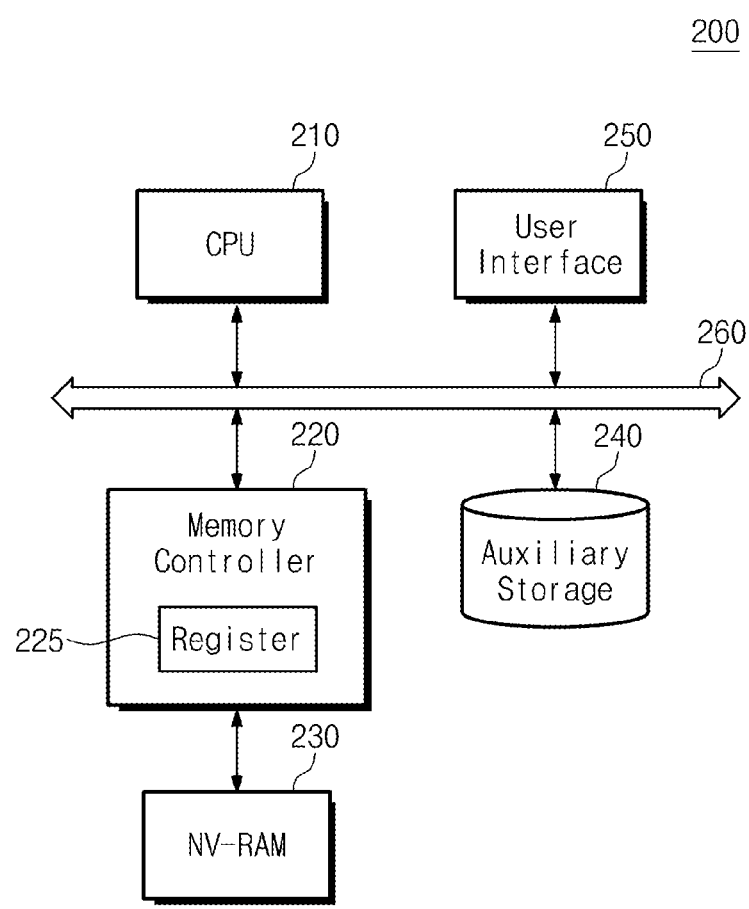
FIG. 8 is a block diagram illustrating a user device according to another embodiment of the inventive concept.

FIG. 8 is a block diagram illustrating a user device according to another embodiment of the inventive concept. Referring to FIG. 8, a user device 200 comprises a memory controller 220 capable of storing register bits. The user device 200 may include a CPU 210, the memory controller 220 including a nonvolatile register 225, a nonvolatile RAM 230, an auxiliary storage device 240, a user interface 250, and a system bus 260.

The components 210, 230, 240, 250, and 260 may be configured the same or substantially the same as those in FIG. 1, and a description thereof is thus omitted. The nonvolatile register 225 may include a register bit indicating whether a page of the nonvolatile RAM 230 is reset, and register bits of the nonvolatile register 225 may be updated periodically. Register bits may be managed at an OS or file system level.

While the user device 200 operates normally, a register bit of the register in the memory controller 220 may be decided according to an attribute of data loaded onto the nonvolatile RAM 230. For example, a code page read from the auxiliary storage device 240 may be first stored at a standby area of the nonvolatile RAM 230. At this time, a register bit of the register 225 corresponding to a code page stored at the standby area may be updated to have logical "1". On the other hand, if a code page of the standby area is shifted into an in use area at the same time when the code page is executed, a register bit corresponding to the code page may be updated to have logical "0". A register bit corresponding to a modified or free area of the nonvolatile RAM 230 may be updated for resetting at booting to have logical "0".

The user device 200 may include the nonvolatile RAM 230 as a main memory. Data corresponding to a program, being in use, of programs loaded onto the nonvolatile RAM 230 may be set to be deleted or reset. On the other hand, an application program loaded onto a standby area of the nonvolatile RAM 230 may be retained without deleting. Thus, although a system is rebooted by an error generated during driving, an infinite loop causing iteration of a system error may be blocked.

Figure 9:
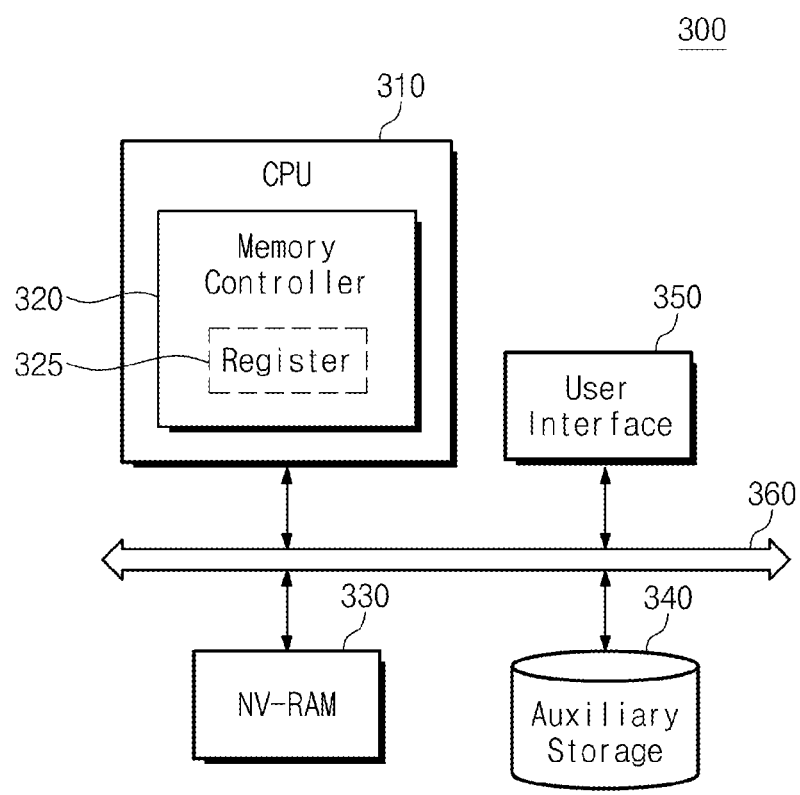
FIG. 9 is a block diagram illustrating a user device according to still another embodiment of the inventive concept.

FIG. 9 is a block diagram illustrating a user device according to still another embodiment of the inventive concept. Referring to FIG. 9, a user device 300 comprises a CPU 310, a memory controller 320, a nonvolatile RAM 330, an auxiliary storage device 340, a user interface 350, and a system bus 360. The memory controller 320 and a register 325 storing a register bit may be included in the CPU 310.

The components 330, 340, 350, and 560 may be configured the same or substantially the same as those in FIG. 1, and a description thereof is thus omitted. The memory controller 320 may include a nonvolatile register 325. In addition, the memory controller 320 may be integrated with the CPU 310. With this configuration, it is possible to manage register bits relatively easily and in high speed.

The user device 300 may include the nonvolatile RAM 330 as a main memory. Data corresponding to a program, being in use, of programs loaded onto the nonvolatile RAM 330 may be set to be deleted or reset. On the other hand, an application program loaded onto a standby area of the nonvolatile RAM 330 may be retained without deleting. Thus, although a system is rebooted by an error generated during driving, an infinite loop causing iteration of a system error may be blocked.

Figure 10:
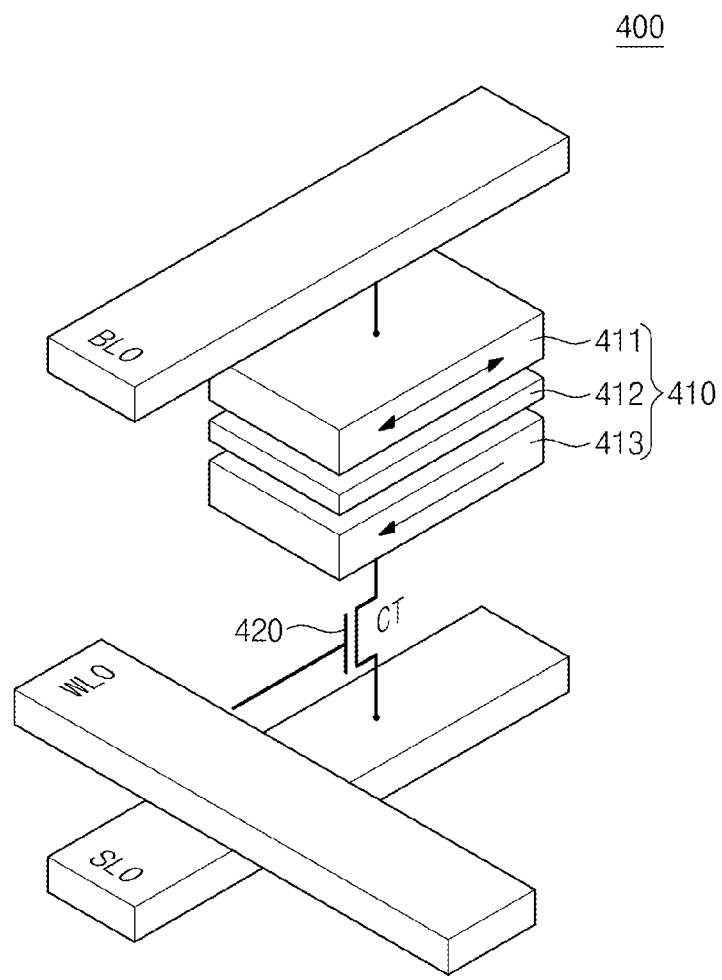
FIGS. 10 and 11 are diagrams illustrating one type of memory cell that may be included in a nonvolatile RAM consistent with an embodiment of the inventive concept.
Figure 11:
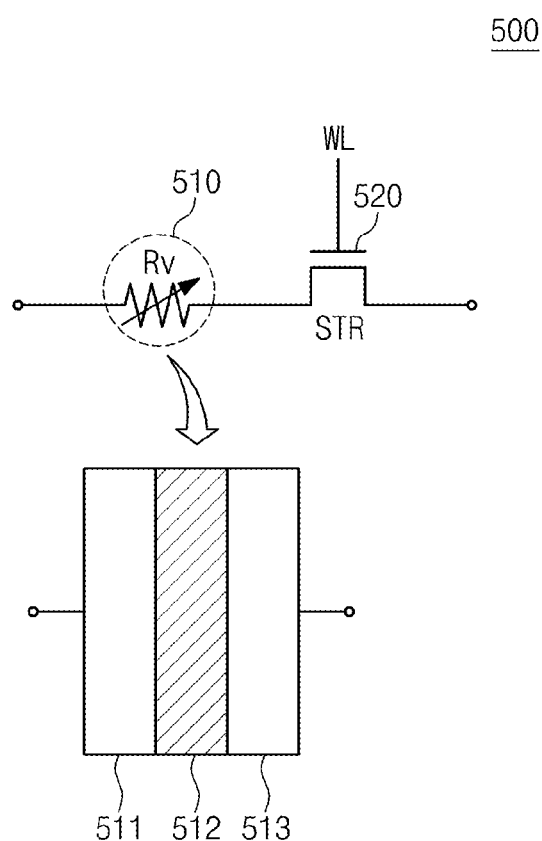

FIGS. 10 and 11 are diagrams illustrating a memory cell included in a nonvolatile RAM of the inventive concept.

Referring to FIG. 10, a Spin Transfer Torque Magneto resistive Random Access Memory (STT-MRAM) cell 400 may be illustrated as a memory cell of a nonvolatile RAM. The memory cell 400 may include a magnetic tunnel junction (MTJ) element 410 and a cell transistor (CT) 420. A gate of the cell transistor 420 may be connected to a word line WL0. One end of the cell transistor 420 may be connected to a bit line BL0 through the MTJ element 410. The other end of the cell transistor 420 may be connected to a source line SL0.

The MTJ element 410 may include a pinned layer 413, a free layer 411, and a tunnel layer 412 interposed between the pinned layer 413 and the free layer 411. A magnetization direction of the pinned layer 413 may be fixed, and a magnetization direction of the free layer 411 may be equal to or opposite to that of the pinned layer 413 according to a condition. An anti-ferromagnetic layer (not shown) may be further provided to fix a magnetization direction of the pinned layer 413.

At a write operation of the STT-MRAM 400, a voltage may be applied to the word line WL0 to turn on the cell transistor 420, and a write current may be applied between the bit line BL0 and the source line SL0. At a read operation of the STT-MRAM 400, data stored at the MTJ element 410 may be determined according to a resistance value measured by applying a turn-on voltage to the word line WL0 to turn on the cell transistor 420 and applying a read current in a direction from the bit line BL0 to the source line SL0.

FIG. 11 is a circuit diagram illustrating a memory cell of a resistive memory device. Referring to FIG. 11, a memory cell 500 of a resistive memory device may include a variable resistance element 510 and a selection transistor 520.

The variable resistance memory 510 may include a variable resistance material for storing data. The selection transistor 520 may selectively supply a current to the variable resistance element 510 according to a bias of a word line WL. As illustrated in FIG. 11, the selection transistor 520 may be formed of an NMOS transistor. However, the selection transistor 520 may be formed of one of switch elements such as a PMOS transistor, a diode, and so on.

The variable resistance element 510 may include a pair of electrodes 511 and 513 and a data storage film 512 interposed between the electrodes 511 and 513. The data storage film 512 may be formed of a bipolar resistance storage substance or a unipolar resistance storage substrate. The bipolar resistance storage substance may be programmed to a set or reset state according to a pulse polarity. The unipolar resistance storage substrate may be programmed to a set or reset state by a pulse having the same polarity. The unipolar resistance storage substrate may include a single transition metal oxide such as NiOx or TiOx. The bipolar resistance storage substance may include a pervoskite material.

STT-MRAM and RRAM are schematically described as a memory cell of a nonvolatile RAM. However, a memory cell of the nonvolatile RAM may not be limited to this disclosure. For example, a memory cell of the nonvolatile RAM may be formed of one of a flash memory cell, a PRAM cell, an MRAM cell, a FRAM cell, and the like.

Figure 12:
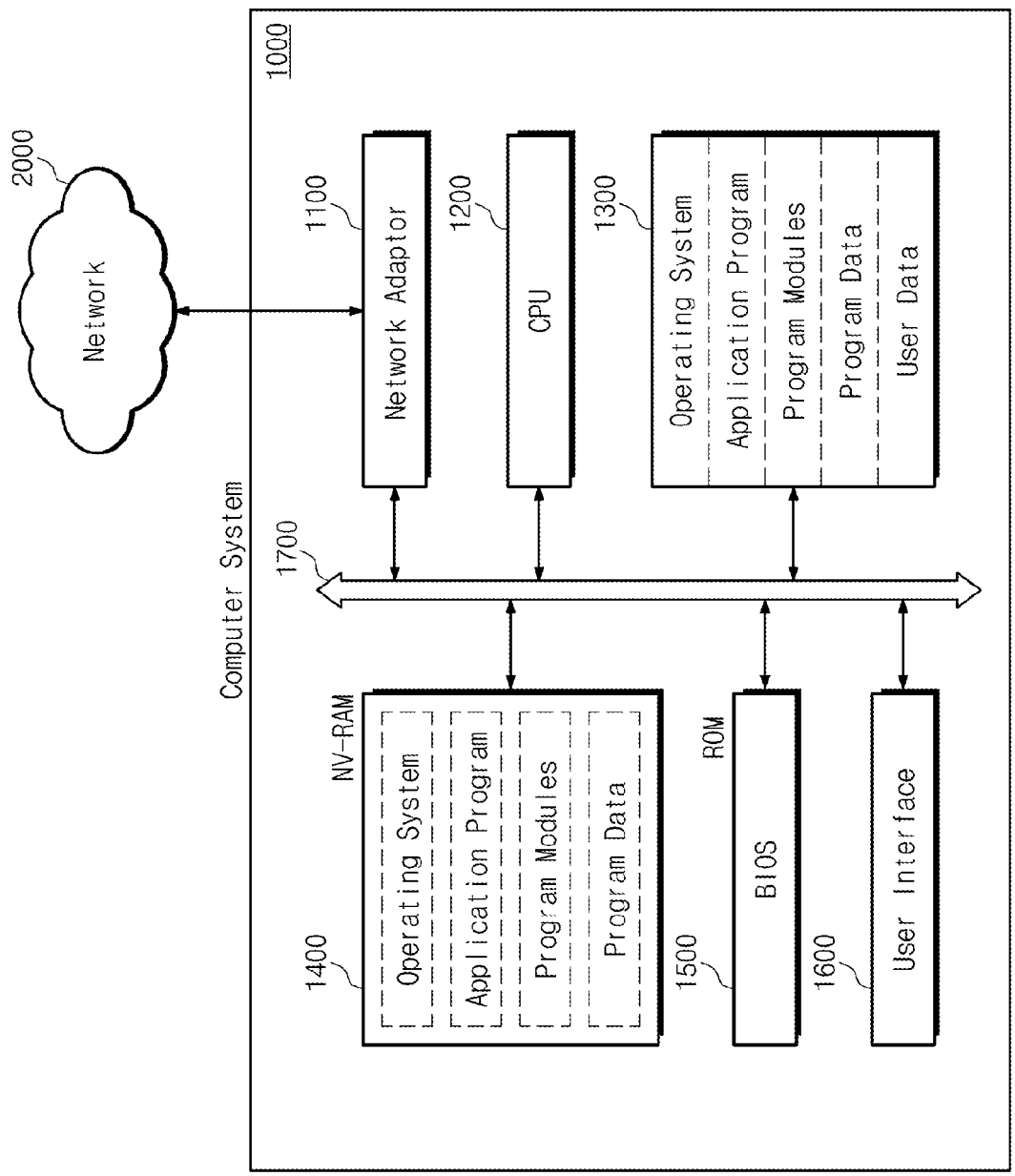
FIG. 12 is a block diagram illustrating a computer system according to an embodiment of the inventive concept.

FIG. 12 is a block diagram illustrating a computer system according to an embodiment of the inventive concept. Referring to FIG. 12, a computer system 1000 comprises a network adaptor 1100, a CPU 1200, a large-capacity storage device 1300, a nonvolatile RAM 1400, a ROM 1500, and a user interface 1600 which are electrically connected to a system bus 1700.

The network adaptor 1100 may provide an interface between the computer system 1000 and external networks 2000. The CPU 1200 may be used to control the overall operation for driving an operating system and an application program which are resident on the nonvolatile RAM 1400. The large-capacity storage device 1300 may store data needed for the computer system 1000. For example, the large-capacity storage device 1300 may store an operating system for driving the computer system 1000, an application program, various program modules, program data, user data, and so on.

The nonvolatile RAM 1400 may be used as a working memory of the computer system 1000. Upon booting, the operating system, the application program, the various program modules, and program data needed to drive programs and various program modules read out from the large-capacity storage device 1300 may be loaded on the nonvolatile RAM 1400. The ROM 1500 may store a basic input/output system (BIOS) which is activated before the operating system is driven upon booting. Information exchange between the computer system 1000 and a user may be made via the user interface 1600.

In addition, the computer system 1000 may further include a battery, a modem, and the like. Although not shown in FIG. 10, the computer system 1000 may further include an application chipset, a camera image processor (CIS), a mobile DRAM, and the like.

The large-capacity storage device 1300 may be formed of HDD or hybrid HDD. In addition, the large-capacity storage device 1300 may be formed of a solid state drive (SSD), an MMC card, an SD card, a micro SD card, a memory stick, an ID card, a PCMCIA card, a chip card, a USB card, a smart card, a CF card, and so on.

With the computer system 1000, page stored at the nonvolatile RAM 140 may be selectively reset at booting. Thus, data of the nonvolatile RAM 1400 corresponding to a source of an error may be reset or deleted at system rebooting due to an error. This may mean that an infinite loop causing iteration of rebooting due to an error is blocked. This configuration on the nonvolatile RAM 1400 may be defined by the BIOS stored at the ROM 1500.

In some embodiments, a nonvolatile RAM and/or a memory controller may be packed using packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), and the like.

While the inventive concept has been described with reference to exemplary embodiments, it will be apparent to those skilled in the art that various changes and modifications may be made without departing from the scope of the present inventive concept. Therefore, it should be understood that the above embodiments are not limiting, but illustrative.

What is claimed is:

1. A data management method for a main memory including a memory controller and a nonvolatile RAM, the method comprising:
designating code page data temporarily stored in a standby area of the nonvolatile RAM as set;
copying the code page data from the standby area to an in-use area of the nonvolatile RAM;
designating the code page data stored in the in-use area as reset; and thereafter,
during rebooting of a user device incorporating the main memory, invalidating the reset code page data while retaining the set code page data in the nonvolatile RAM.

2. The method of claim 1, wherein the code page data is designated set and reset in accordance with register bits respectively associated with each code page in the code page data.

3. The method of claim 2, wherein a register bit respectively associated with each code page is stored with the code page in the nonvolatile RAM.

4. The method of claim 2, wherein the register bits are collectively stored in the memory controller.

5. The method of claim 2, wherein the register bits are collectively stored in a register of the memory controller.

6. The method of claim 1, wherein the main memory of the user device is incorporated within a Central Processing Unit (CPU).

7. The method of claim 1, further comprising:
copying the code page data from an auxiliary storage and writing the code page data in the standby area of the nonvolatile RAM.

8. The method of claim 1, further comprising:
detecting a power-off command; and
upon detecting a power-off command, collecting all code pages in the code page data designated as set into a predetermined area of the nonvolatile RAM.

9. The method of claim 1, further comprising:
setting a maximum size for the standby area of the nonvolatile RAM.

10. The method of claim 1, further comprising:
generating a data page upon execution of a code page in the code page data; and
storing the data page in a modified area of the nonvolatile RAM, wherein the data page is designated as reset.

11. A data management method for a main memory including a memory controller and a nonvolatile RAM, the method comprising:
executing a power-on routine in a user device incorporating the main memory;
determining whether the nonvolatile RAM is reset enabled;
upon determining that the nonvolatile RAM is reset enabled, invalidating code page data designated as reset while retaining the code page data designated as set in the nonvolatile RAM, and then loading an operating system from an auxiliary storage to the nonvolatile RAM, else
upon determining that the nonvolatile RAM is not reset enabled, loading the operating system from the auxiliary storage to the nonvolatile RAM.

12. The method of claim 11, wherein the code page data is designated as set upon being temporarily stored in a standby area of the nonvolatile RAM when copied from the auxiliary storage, and the code page data is designated as reset upon being moved from the standby area to an in-use area of the nonvolatile RAM prior to execution.

13. The method of claim 12, wherein the code page data is designated set and reset in accordance with register bits respectively associated with each code page in the code page data.

14. The method of claim 13, wherein a register bit respectively associated with each code page is stored with the code page in the nonvolatile RAM.

15. The method of claim 13, wherein the register bits are collectively stored in the memory controller.

16. A data management method for a main memory including a memory controller and a nonvolatile RAM, the method comprising:
executing a power-on routine in a user device incorporating the main memory;
determining whether the user device was abnormally powered-down;
upon determining that the user device was abnormally powered-down, invalidating code page data designated as reset while retaining the code page data designated as set in the nonvolatile RAM, and then loading an operating system from an auxiliary storage to the nonvolatile RAM, else
upon determining that the user device was not abnormally powered-down, executing the operating system without regard to the set and reset designation of the code page data stored in the nonvolatile RAM.

17. The method of claim 16, wherein the code page data is designated as set upon being temporarily stored in a standby area of the nonvolatile RAM when copied from the auxiliary storage, and the code page data is designated as reset upon being moved from the standby area to an in-use area of the nonvolatile RAM prior to execution.

18. The method of claim 16, wherein the code page data is designated set and reset in accordance with register bits respectively associated with each code page in the code page data.

19. The method of claim 18, wherein a register bit respectively associated with each code page is stored with the code page in the nonvolatile RAM.

20. The method of claim 18, wherein the register bits are collectively stored in the memory controller.

* * * * *